United States Patent
Miyazaki

(10) Patent No.: US 7,428,354 B2
(45) Date of Patent: Sep. 23, 2008

(54) SYSTEM FOR DETECTING FAULT IN OPTICAL-TRANSMISSION PATH

(75) Inventor: Takashi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 18 days.

(21) Appl. No.: 11/080,554

(22) Filed: Mar. 16, 2005

(65) Prior Publication Data

US 2005/0157978 A1 Jul. 21, 2005

Related U.S. Application Data

(63) Continuation of application No. PCT/JP03/04034, filed on Mar. 28, 2003.

(51) Int. Cl.
*G02B 6/28* (2006.01)
*H04B 10/08* (2006.01)
*H04B 17/00* (2006.01)

(52) U.S. Cl. .................. 385/24; 398/1; 398/15; 398/17; 398/20

(58) Field of Classification Search .............. 398/1, 398/15, 17, 20, 22, 23; 385/24
See application file for complete search history.

(56) References Cited

U.S. PATENT DOCUMENTS

| | | | | |
|---|---|---|---|---|
| 5,778,117 | A * | 7/1998 | Inoue et al. | 385/24 |
| 5,793,481 | A | 8/1998 | Leali | 356/73.1 |
| 5,914,794 | A * | 6/1999 | Fee et al. | 398/20 |
| 6,011,623 | A * | 1/2000 | MacDonald et al. | 356/519 |

(Continued)

FOREIGN PATENT DOCUMENTS

EP 0 903 875 3/1993

(Continued)

OTHER PUBLICATIONS

P.B. Hansen, et al., "539km Unrepeatered Transmission at 2,488 BGit/s Using Dispersion Compensation, Forward Error Correction, and Remote Post- and Pre-Amplifiers Pumped by Diode-Pumped Raman Lasers", Electronic Letters, Vol. 31, No. 17, Aug. 17, 1995, pp. 1460-1461.

(Continued)

*Primary Examiner*—Sung Pak
*Assistant Examiner*—Daniel Petkovsek
(74) *Attorney, Agent, or Firm*—Staas & Halsey LLP

(57) ABSTRACT

An optical transmission-path fault-detection system for detecting a fault in an optical-transmission path connecting an optical communications apparatus and an optical amplifier corresponding to the communications apparatus is disclosed. The system includes a first light-beam source connected via a first optical transmission path to the optical amplifier for transmitting a light beam to the first optical-transmission path, first optical-detection means for detecting the light beam which is transmitted from the first light-beam source and input via the first optical-transmission path, the optical amplifier and a second optical-transmission path, and first fault-determining means for determining, when a light-beam level detected by the first optical-detection means is lower than a predetermined level, that the fault has occurred in one of the first optical-transmission path and the second optical-transmission path, and determining, when the light-beam level is at or higher than the predetermined level, that the first optical-transmission path and the second optical-transmission path are normal.

19 Claims, 6 Drawing Sheets

U.S. PATENT DOCUMENTS

| | | | |
|---|---|---|---|
| 6,344,915 | B1 | 2/2002 | Alexander et al. |
| 6,359,708 | B1 * | 3/2002 | Goel et al. .................... 398/15 |
| 6,504,630 | B1 * | 1/2003 | Czarnocha et al. ............ 398/15 |
| 6,547,453 | B1 * | 4/2003 | Stummer et al. .............. 385/88 |
| 6,654,513 | B1 * | 11/2003 | Lidén et al. ................... 385/24 |
| 6,661,947 | B2 * | 12/2003 | Shirai .......................... 385/24 |
| 6,681,079 | B1 * | 1/2004 | Maroney ..................... 398/15 |
| 6,807,001 | B1 * | 10/2004 | Ranka et al. ............. 359/341.3 |
| 6,937,820 | B2 * | 8/2005 | Iwaki et al. .................... 398/6 |
| 7,039,313 | B2 * | 5/2006 | Casanova et al. ............ 398/18 |
| 7,113,698 | B1 * | 9/2006 | Ryhorchuk et al. ........... 398/10 |
| 7,130,537 | B1 * | 10/2006 | Maxham ...................... 398/17 |

FOREIGN PATENT DOCUMENTS

| | | |
|---|---|---|
| EP | 0 784 388 | 7/1997 |
| JP | 8-293835 | 11/1996 |
| JP | 11-205243 | 7/1999 |
| JP | 11-511620 | 10/1999 |
| JP | 2002-77056 | 3/2002 |
| WO | WO 97/10651 | 3/1997 |
| WO | WO 97/23964 | 7/1997 |
| WO | WO 00/60773 | 10/2000 |

OTHER PUBLICATIONS http://www.alcatel.com/submarien/products/ur/.

International Search Report dated, Jul. 15, 2003, for related PCCT Patent Application No. PCT/JP03/04034.

Japanese Patent Office Action, mailed Jul. 3, 2007, and issued in corresponding Japanese Patent Application No. 2004-570145.

European Search Report, dated Oct. 31, 2006, and issued in corresponding European Patent Application No. 03816543.7-2415.

* cited by examiner

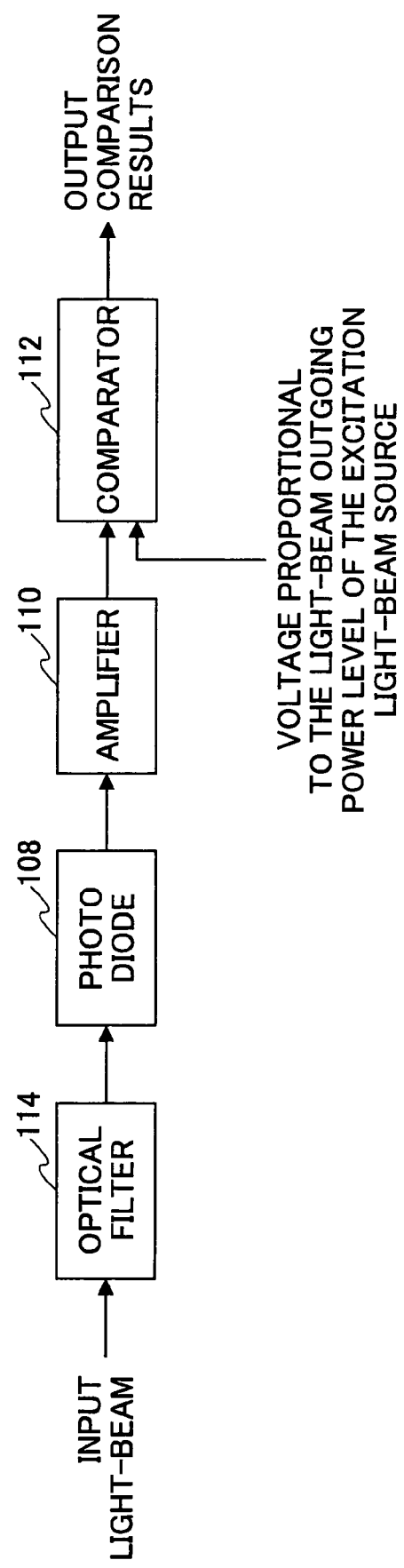

SYSTEM FOR DETECTING FAULT IN OPTICAL-TRANSMISSION PATH

CROSS-REFERENCE TO RELATED APPLICATION

This application is a U.S. continuation application filed under 35 USC 111(a) claiming benefit under 35 USC 120 and 365(c) of PCT application JP2003/004034, filed Mar. 28, 2003. The foregoing application is hereby incorporated herein by reference.

BACKGROUND OF THE INVENTION

1. Field of the Invention

The present invention generally relates to a technology for optical transmission, and particularly relates to a system for detecting a fault in an optical transmission path connecting an optical-communications apparatus and an optical amplifier corresponding to the communications apparatus.

2. Description of the Related Art

In an optical-transmission path, and more specifically in communications using optical fibers, unrepeatered systems may be adopted that have along the way no repeaters requiring feeding. In such unrepeatered systems, as a method of increasing the transmission distance, there is a method of placing an optical amplifier having an Erbium-Doped Fiber (Below represented as "EDF") along the transmission path so as to excite this EDF by a light beam transmitted from a terminal station (a communications apparatus at the transmitter or a communications apparatus at the receiver). When trying to increase the transmission distance, a light beam is sent from the terminal station to the EDF within the optical amplifier by means of an optical fiber dedicated to an excitation light-beam that is different from an optical fiber for a signal light-beam (For example, Non-patent document 1: P. B. Hansen, L. Eskilden, S. G. Grubb, A. M. Vengsarkar, S. K. Korotky, T. A. Strasser, J. E. J. Alphonsus, J. J. Veselka, D. J. DiGiovanni, D. W. Peckham, E. C. Beck, D. Truxal, W. Y. Cheung, S. G. Kosinski, D. Gasper, P. F. Wysocki, V. L. da Silva and J. R. Simpson, "529 km Unrepeatered transmission at 2.488 Gbits/s using dispersion compensation, forward error correction, and remote post and pre-amplifiers pumped by diode pumped Raman lasers", Electronic Letters, vol. 31, 1995, pages 1460-1461, and http://www.alcatel.com/submarine/products/ur/).

In such unrepeatered systems, the outgoing power levels of the signal light-beam and of the excitation light-beam at the transmitting communications apparatus respectively may even reach a level of 1 W or more. Therefore, when an optical fiber has been cut by chance, a light beam irradiated from the cut face may be hazardous to the human body. Moreover, there is a danger that a phenomenon called fiber fusing in which an optical fiber burns may occur. Therefore, from a point of view of achieving safety, there are methods that detect, when an optical fiber connecting a terminal station that is often constructed onshore and an optical amplifier has been cut, a reflecting light-beam generated at the cut face, and that stop the light beam from being output from the terminal station (refer, for instance, to Patent Document 1: JP08-29835A); and that have both terminal stations send to each other a supervisory-control signal of a low outgoing power level before sending out a signal light-beam and an excitation light-beam so as to send the signal light-beam and the excitation light-beam after confirming continuity (refer to, for instance, Non-patent document 2: T. Otani, T. Maki, H. Deguchi, H. Irie, T. Takahashi, E. Ishikawa, D. Ikeda, S. Harasawa, "10G×32-wave 250 km unrepeatered transmission system development", the Institute of Electronics, Information, and Communication Engineers, Lecture Notes of the 2003 General Conference, page 474, B.10.44).

However, with the method of detecting the reflecting light-beam generated at the cut face of the optical fiber and stopping the light beam from being output from the terminal station, the reflecting light may not be detected due to the reflection being small depending on the shape of the cut face. Moreover, when the cut face is immersed in a liquid such as water having a small refractive index relative to glass, etc., the reflecting light may not be detected with the reflection being so small.

Furthermore, in the method of having both terminal stations send to each other the supervisory-control signal of the low outgoing power level before sending out the signal light-beam and the excitation light-beam so as to send the signal light-beam and the excitation light-beam after confirming continuity, when the distance between the terminal stations is long, there may be a case such that as the outgoing power level of the supervisory-control signal sent from one terminal station is low, the other terminal station is not able to receive this supervisory-control signal due to attenuation in transmission.

SUMMARY OF THE INVENTION

It is a general object of the present invention to provide a technology for optical transmission that substantially obviates one or more problems caused by the limitations and disadvantages of the related art.

It is a more particular object of the present invention to provide a system for detecting a fault in an optical transmission path connecting an optical-communications apparatus and an optical amplifier corresponding to the communications apparatus.

According to the invention, an optical transmission-path fault-detection system for detecting a fault in an optical-transmission path connecting an optical communications apparatus and an optical amplifier corresponding to the communications apparatus includes a first light-beam source connected via a first optical transmission path with the optical amplifier for transmitting a light beam to the first optical-transmission path, first optical-detection means for detecting a light beam which is transmitted from the first light-beam source and input via the first optical-transmission path, the optical amplifier and a second optical-transmission path, and first fault-determining means for determining, when a light-beam level detected by the first optical-detection means is lower than a predetermined level, that the fault has occurred in one of the first optical-transmission path and the second optical-transmission path, and determining, when the light-beam level is at or higher than the predetermined level, that the first optical-transmission path and the second optical-transmission path are normal.

The system for detecting the fault in the optical transmission path as described above enhances accuracy of detecting the fault and prevents occurrences which are hazardous to the human body.

Other objects and further features of the present invention will become apparent from the following detailed description when read in conjunction with the accompanying drawings.

BRIEF DESCRIPTION OF THE DRAWINGS

FIG. 6 is a third configuration example of the excitation light-beam detector.

DETAILED DESCRIPTION OF THE PREFERRED EMBODIMENTS

In the following, embodiments according to the present invention are described with reference to the accompanying drawings.

Figure 1:
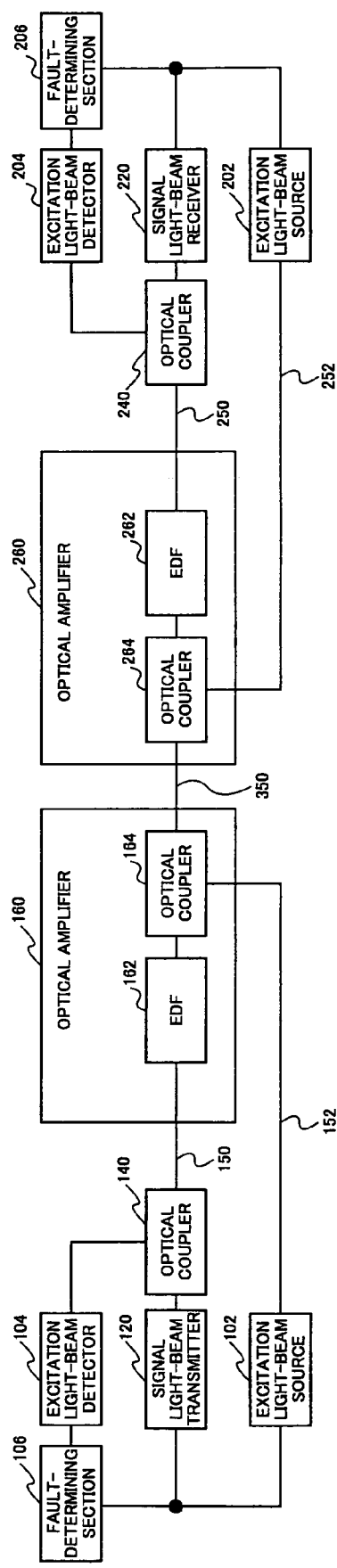
FIG. 1 is a diagram illustrating a first configuration example of an optical transmission system.

FIG. 1 is a diagram illustrating a first configuration example of an optical transmission system having a system for detecting a fault in an optical-transmission path. The illustrated optical transmission system comprises an excitation light-beam source 102, an excitation light-beam detector 104, a fault-determining section 106, a signal light-beam transmitter 120 and an optical coupler 140 that are configured within a communications apparatus at the transmitting-station side, an optical amplifier 160 corresponding to the communications apparatus at the transmitting-station side, an excitation light-beam source 202, an excitation light-beam detector 204, a fault-determining section 206, a signal light-beam receiver 220 and an optical coupler 240 that are configured within a communications apparatus at the receiving-station side, and an optical amplifier 260 corresponding to the communications apparatus at the receiving-station side.

The optical amplifier 160 comprises an Erbium-Doped Fiber (EDF) 162 and an optical coupler 164. Then the optical coupler 140 within the communications apparatus at the transmitting-station side and the EDF 162 within the optical amplifier 160 are connected by an optical fiber 150, while the excitation light-beam source 102 within the communications apparatus at the transmitting-station side and the optical coupler 164 within the optical amplifier are connected by an optical fiber 152. Moreover, the optical amplifier 260 comprises an EDF 262 and an optical coupler 264. Then, the optical coupler 240 within the communications apparatus at the receiving-station side and the EDF 262 within the optical amplifier 260 are connected by an optical fiber 250, while the excitation light-beam source 202 within the communications apparatus at the receiving-station side and the optical coupler 264 at the optical amplifier 260 are connected by an optical fiber 252.

In this optical transmission system, a signal light-beam is transmitted from the communications apparatus at the transmitting-station side to the communications apparatus at the receiving-station side. This signal light-beam is transmitted through the optical fibers 150, 350 and 250. The excitation light-beam source 102, the excitation light-beam detector 104 and the fault-determining section 106 within the communications apparatus at the transmitting station configure a system for detecting a fault in the optical transmission path for detecting a fault in the optical fibers 150 and 152 (below represented as "the transmitting optical-transmission path fault-detection system"). On the other hand, the excitation light-beam source 202, the excitation light-beam detector 204 and the fault-determining section 206 within the communications apparatus at the receiving station configure a system for detecting a fault in the optical transmission path for detecting a fault in the optical fibers 250 and 252 (below represented as "the receiving optical-transmission path fault-detection system").

Below, an operation of the optical transmission system illustrated in FIG. 1 is described for a first embodiment for detecting a fault in the optical fibers 150, 152, 250 and 252 before the signal light-beam is transmitted from the transmitting communications apparatus to the receiving communications apparatus, and a second embodiment for detecting a fault in the optical fibers 150, 152, 250 and 252 while the signal light-beam is being transmitted from the transmitting communications apparatus to the receiving communications apparatus.

First, the first embodiment is described. The excitation light-beam source 102 configuring the transmitting optical-transmission path fault-detection system within the transmitting communications apparatus transmits a light beam at a predetermined low outgoing power level. For example, the excitation light-beam source 102 transmits the light beam at 10 mW, an outgoing power level at or lower than Class 1. The light beam from the excitation light-beam source 102 is transmitted through the optical fiber 152 and input to the optical coupler 164 within the optical amplifier 160.

The optical coupler 164 may be, for instance, a small-loss wavelength-multiplexing coupler which makes changing the light-beam destination for each wavelength possible. This optical coupler 164 inputs the light beam from the optical fiber 152 into the EDF 162. The light beam input into the EDF 162 passes through the EDF 162 while being attenuated, then is transmitted through the optical fiber 150 for inputting into the optical coupler 140. The optical coupler 140, as in the case of the optical coupler 164, may be a small-loss wavelength-multiplexing coupler, for instance. This optical coupler 140 inputs the light beam from the optical fiber 150 into the excitation light-beam detector 104.

The excitation light-beam detector 104 detects the input light-beam. Then, the excitation light-beam detector 104 compares the detected light-beam level with a first predetermined level. The comparison result is sent to the fault-determining section 106.

The fault-determining section 106 based on the comparison result from the excitation light-beam detector 104 determines whether there is a fault occurring in the optical fibers 150 or 152. More specifically, a case is considered such that the comparison result from the excitation light-beam detector 104 indicates that the light-beam level input into the excitation light-beam detector 104 is at or higher than the first predetermined level. In this case, as the comparison result indicates that the light-beam loss from the excitation light-beam source 102 to the excitation light-beam detector 104 is small, the fault-determining section 106 determines that the optical fibers 150 and 152 are normal. On the other hand, a case is considered such that the comparison result from the excitation light-beam detector 104 indicates that the light-beam level input into the excitation light-beam detector 104 is lower than the first predetermined level. In this case, as the comparison result indicates that the light-beam loss from the excitation light-beam source 102 to the excitation light-beam detector 104 is large, the fault-determining section 106 determines that a fault has occurred in one of the optical fibers 150 and 152.

The fault-determining section 106, when determining that the optical fibers 150 and 152 are normal, instructs the signal light-beam transmitter 120 to start transmitting a signal light beam and also instructs the excitation light-beam source 102 so as to increase the light-beam outgoing power level up to a level for the EDF 162 to be suitably excited. The signal light-beam transmitter 120 begins transmitting the signal light-beam in response to the instruction from the fault-determining section 106. On the other hand, the excitation light-beam source 102 increases the excitation light-beam outgoing power level up to the level for the EDF 162 to be suitably excited in accordance with the instruction from the fault-determining section 106. Hereby, a signal light-beam from the signal light-beam transmitter 120 is amplified by the EDF 162 for sending to the receiving communications apparatus.

Moreover, the fault-determining section 106 when determining that a fault has occurred in one of the optical fibers 150 and 152 instructs the excitation light-beam source 102 to stop transmitting a light beam. The excitation light-beam source 102 stops transmitting the light beam in response to this instruction.

On the other hand, the excitation light-beam source 202 configuring the receiving optical transmission-path fault-detection system within the receiving communications apparatus, as in the case of the excitation light-beam source 102, transmits a light beam at a predetermined low outgoing power level (for example, at 10 mW, an outgoing power level at or lower than Class 1). The light beam from the excitation light-beam source 202 is transmitted through the optical fiber 252 for inputting into the optical coupler 264 within the optical amplifier 260.

The optical coupler 264, which may be a small-loss wavelength-multiplexing coupler, for instance, inputs the light beam from the optical fiber 252 into EDF 262. The light beam input into the EDF 262 passes through the EDF 262 while being attenuated, and then is transmitted through the optical fiber 250 for inputting into the optical coupler 240. The optical coupler 240, which may be a small-loss wavelength-multiplexing coupler, for instance, as in the case of the optical coupler 264, inputs the light from the optical fiber 250 into the excitation light-beam detector 204.

The excitation light-beam detector 204 as in the case of the excitation light-beam detector 104 detects the light beam input. Then the excitation light-beam detector 204 compares the detected light-beam level with a second predetermined level. The comparison result is sent to the fault-determining section 206.

The fault-determining section 206 as in the case of the fault-determining section 106 determines whether a fault has occurred in the optical fibers 250 and 252 based on the comparison result from the excitation light-beam detector 204. More specifically, when the comparison result from the excitation light-beam detector 204 indicates that the level of the light beam input into the excitation light-beam detector 204 is at or higher than the second predetermined level, the fault-determining section 206 determines that the optical fibers 250 and 252 are normal. On the other hand, when the comparison result from the excitation light-beam detector 204 indicates that the level of the light beam input into the excitation light-beam detector 204 is less than the second predetermined level, the fault-determining section 206 determines that a fault has occurred in one of the optical fibers 250 and 252.

The fault-determining section 206 when determining that the optical fibers 250 and 252 are normal instructs the excitation light-beam source 202 so as to increase the outgoing power level of the excitation light to a level for the EDF 262 to be suitably excited. The excitation light-beam source 202 increases the outgoing power level of the excitation light to the level for the EDF 262 to be suitably excited. Hereby, a signal light-beam passing through the EDF 262 is amplified for sending to the receiving communications apparatus.

Moreover, the fault-determining section 206 when determining that there is a fault in one of the optical fibers 250 and 252, instructs the excitation light-beam source 202 to stop transmitting a light beam. The excitation light-beam source 202 stops transmitting the light beam in response to this instruction.

Next, the second embodiment is described. The excitation light-beam source 102 configuring the transmitting optical-transmission path fault-detection system within the transmitting communications apparatus suitably excites the EDF 162 so as to transmit an excitation light beam at a predetermined high outgoing power level in order to transmit the signal light-beam from the signal light-beam transmitter 120 to the receiving communications apparatus. It is noted that this excitation light-beam has a wavelength different from a signal light-beam transmitted from the signal light-beam transmitter 120. The excitation light beam from the excitation light-beam source 102 is transmitted through the optical fiber 152 and is input into the optical coupler 164 within the optical amplifier 160.

The optical coupler 164 sends the signal light-beam that is transmitted from the signal light-beam transmitter 120 and passed through the optical coupler 140, the optical fiber 150 and the EDF 162, to the receiving communications apparatus. Then, the optical coupler 164 inputs the excitation light-beam from the optical fiber 152 into the EDF 162. The excitation light-beam input into the EDF 162 passes through the EDF 162 while being attenuated, then is transmitted through the optical fiber 150 for inputting into the optical coupler 140. The optical coupler 140 inputs the signal light-beam transmitted from the signal light-beam transmitter 120 into the optical fiber 150 and inputs the excitation light-beam from the optical fiber 150 into the excitation light-beam detector 104.

The excitation light-beam detector 104 detects the input excitation light-beam. Then, the excitation light-beam detector 104 compares the detected excitation light-beam level with a third predetermined level. The comparison result is sent to the fault-determining section 106.

The fault-determining section 106 based on the comparison result from the excitation light-beam detector 104 determines whether there is a fault occurring in the optical fibers 150 and 152. More specifically, as in the first embodiment, when the comparison result from the excitation light-beam detector 104 indicates that the excitation light-beam level input into the excitation light-beam detector 104 is at or greater than the third predetermined level, the fault-determining section 106 determines that the optical fibers 150 and 152 are normal. On the other hand, when the comparison result from the excitation light-beam detector 104 indicates that the excitation light-beam level input into the excitation light-beam detector 104 is lower than the third predetermined level, the fault-determining section 106 determines that a fault has occurred in one of the optical fibers 150 and 152.

Then, the fault-determining section 106 when determining that a fault has occurred in one of the optical fibers 150 and 152 instructs the signal light-beam transmitter 120 to stop transmitting a signal light beam and the excitation light-beam source 102 to stop transmitting an excitation light beam. The signal light-beam transmitter 120 stops transmitting the signal light-beam in response to the instruction from the fault-determining section 106. On the other hand, the excitation light-beam source 102 stops transmitting the excitation light beam in response to the instruction from the fault-determining section 106.

On the other hand, the fault-determining section 106, when determining that the optical fibers 150 and 152 are normal, instructs neither the signal light-beam transmitter 120 nor the excitation light-beam source 102. Thus, the signal light-beam transmitter 120 continues transmitting the signal light-beam while the excitation light-beam source 102 continues transmitting the excitation light-beam.

Now, the excitation light-beam source 202 configuring the receiving optical transmission-path fault-detection system within the receiving communications apparatus, as in the case of the excitation light-beam source 102, suitably excites the EDF 262 so as to transmit an excitation light-beam at a predetermined high outgoing power level in order to transmit the signal light-beam from the signal light-beam transmitter 120 to the receiving communications apparatus. It is noted that this excitation light-beam has a wavelength which is different from the signal light-beam transmitted from the signal light-beam transmitter 120. The excitation light-beam from the excitation light-beam source 202 is transmitted through the optical fiber 252 for inputting into the optical coupler 264 within the optical amplifier 260.

The optical coupler 264 inputs into EDF 262 the signal light-beam that is transmitted from the signal light-beam transmitter 120 and that passes through the optical coupler 140, the optical fiber 150, the EDF 162, the optical coupler 164 and the optical fiber 350, and the excitation light-beam that passes through the optical fiber 252. The signal and excitation light-beams input into the EDF 262 pass through the EDF 262, and then are transmitted through the optical fiber 250 for inputting into the optical coupler 240. The optical coupler 240 inputs the signal light-beam into the signal light-beam receiver 220 and the excitation light-beam into the excitation light-beam detector 204.

The excitation light-beam detector 204 as in the case of the excitation light-beam detector 104 detects the excitation light-beam input. Then the excitation light-beam detector 204 compares the detected excitation light-beam level with a fourth predetermined level. The comparison result is sent to the fault-determining section 206.

The fault-determining section 206 as in the case of the fault-determining section 106 determines whether a fault has occurred in the optical fibers 250 or 252 based on the comparison result from the excitation light-beam detector 204. More specifically, as in the first embodiment, when the comparison result from the excitation light-beam detector 204 indicates that the level of the excitation light-beam input into the excitation light-beam detector 204 is at or higher than the fourth predetermined level, the fault-determining section 206 determines that the optical fibers 250 and 252 are normal. On the other hand, when the comparison result from the excitation light-beam detector 204 indicates that the level of the excitation light-beam input into the excitation light-beam detector 204 is lower than the fourth predetermined level, the fault-determining section 206 determines that a fault has occurred in one of the optical fibers 250 and 252.

Moreover, the fault-determining section 206 when determining that there is a fault in one of the optical fibers 250 and 252, instructs the excitation light-beam source 202 to stop transmitting an excitation light beam. The excitation light-beam source 202 stops transmitting the excitation light-beam in response to the instruction from the fault-determining section 206. Thus, the excitation light-beam is transmitted to neither of the optical fibers 250 and 252. Moreover, even when a signal light-beam is transmitted from the signal light-beam transmitter 120, the EDF 262 is not excited so that the signal light-beam is not transmitted through the optical fiber 250.

Now, the fault-determining section 206 when determining that the optical fibers 250 and 252 are normal does not instruct the excitation light-beam source 202. Thus, the excitation light-beam source 202 continues transmitting the excitation light-beam.

Figure 2:
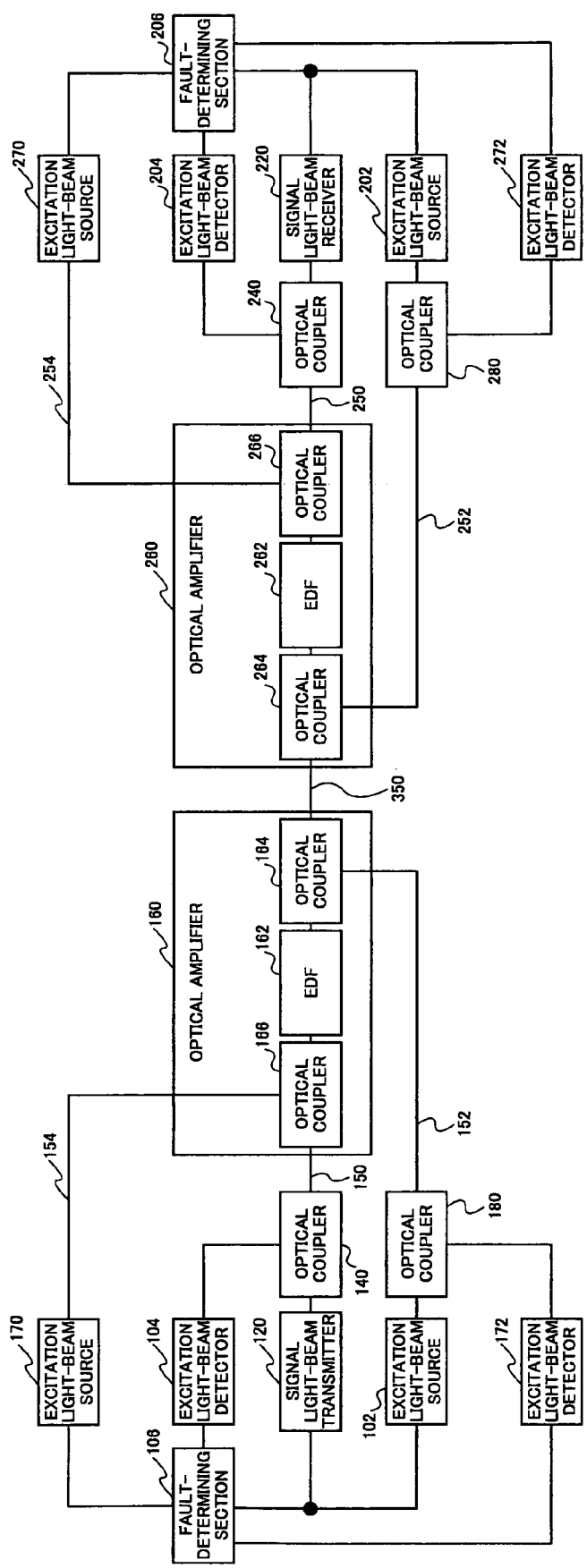
FIG. 2 is a diagram illustrating a second configuration example of the optical transmission system.

FIG. 2 is a diagram illustrating a second configuration example of the optical transmission system having the optical transmission-path fault-detection system of the present invention. The optical transmission system illustrated in FIG. 2, as compared with the optical transmission system illustrated in FIG. 1, comprises an optical coupler 166 in an optical amplifier 160 between an optical fiber 150 and an EDF 162, the optical coupler 166 and an excitation light-beam source 170 that is configured within the transmitting communications apparatus being connected via an optical fiber 154, and further comprises an optical coupler 180 between an excitation light-beam source 102 and an optical coupler 164 within the optical amplifier 160, an excitation light-beam detector 172 being connected to this optical coupler 180. Moreover, the optical transmission system illustrated in FIG. 2 comprises an optical coupler 266 in an optical amplifier 260 between an optical fiber 250 and an EDF 262, the optical coupler 266 and an excitation light-beam source 270 that is configured within the receiving communications apparatus being connected via an optical fiber 254, and further comprises an optical coupler 280 between an excitation light-beam source 202 and an optical coupler 264 within the optical amplifier 260, an excitation light-beam detector 272 being connected to this optical coupler 280.

In the optical transmission system illustrated in FIG. 2, as in the optical transmission system illustrated in FIG. 1, a signal light-beam is transmitted from the communications apparatus at the transmitting-station side to the communications apparatus at the receiving-station side. This signal light-beam is transmitted through the optical fibers 150, 350 and 250. The excitation light-beam source 102, the excitation light-beam detector 104, the fault-determining section 106, the excitation light-beam source 170, and the excitation light-beam detector 172 within the communications apparatus at the transmitting station configure a system for detecting a fault in the optical transmission path for detecting a fault in the optical fibers 150, 152 and 154 (the transmitting optical-transmission path fault-detection system). On the other hand, the excitation light-beam source 202, the excitation light-beam detector 204, the fault-determining section 206, the excitation light-beam source 270 and the excitation light-beam detector 272 within the communications apparatus at the receiving station configure a system for detecting a fault in the optical transmission path for detecting a fault in the optical fibers 250, 252 and 254 (the receiving optical-transmission path fault-detection system).

Below, an operation of the optical transmission system illustrated in FIG. 2 is described for a third embodiment for detecting a fault in the optical fibers 150, 152, 154, 250, 252 and 254 before the signal light-beam is transmitted from the transmitting communications apparatus to the receiving communications apparatus, and a fourth embodiment for detecting a fault in the optical fibers 150, 152, 154, 250, 252 and 254 while the signal light-beam is being transmitted from the transmitting communications apparatus to the receiving communications apparatus.

Now, the third embodiment is described. The excitation light-beam source 102 configuring the transmitting optical-transmission path fault-detection system within the transmitting communications apparatus transmits a light beam at a predetermined low outgoing power level. The light beam from the excitation light-beam source 102 is input to the optical coupler 180. The optical coupler 180, which may be, for instance, a small-loss wavelength-multiplexing coupler, inputs the light beam from the excitation light-beam source 102 via the optical fiber 152 to the optical coupler 164 within the optical amplifier 160.

The optical coupler 164, which may be, for instance, a small-loss wavelength-multiplexing coupler, inputs the light beam from the optical fiber 152 into the EDF 162. The light beam input into the EDF 162 passes through the EDF 162 while being attenuated, and is input into the optical coupler 166. The optical coupler 166, which may be, for instance, a small-loss wavelength-multiplexing coupler, inputs the light beam from the EDF 162 into the optical fiber 150. The optical coupler 140, which may be a small-loss wavelength-multiplexing coupler, for instance, inputs the light beam from the optical fiber 150 into the excitation light-beam detector 104.

The excitation light-beam detector 104 detects the input light-beam. Then, the excitation light-beam detector 104 compares the detected light-beam level with a fifth predetermined level. The comparison result is sent to the fault-determining section 106.

The fault-determining section 106, when the comparison result from the excitation light-beam detector 104 indicates that the light-beam level input into the excitation light-beam detector 104 at or higher than the fifth predetermined level, determines that the optical fibers 150 and 152 are normal. On the other hand, the fault-determining section 106, when the comparison result from the excitation light-beam detector 104 indicates that the light-beam level input into the excitation light-beam detector 104 is lower than the fifth predetermined level, determines that a fault has occurred in one of the optical fibers 150 and 152.

The excitation light-beam source 170 transmits a light beam at a predetermined low outgoing power level. It is noted that the light beam transmitted from the excitation light-beam source 170 has a wavelength which is different from the light beam transmitted from the excitation light source 102. The light beam from the excitation light-beam source 170 is input into the optical coupler 166. The optical coupler 166 inputs the light from the excitation light source 170 into the EDF 162. The light-beam input into the EDF 162 passes through the EDF 162 while being attenuated for inputting into the optical coupler 164. The optical coupler 164 inputs into the optical fiber 152 the light beam that is transmitted from the excitation light-beam source 170 and that passes through the optical fiber 154, the optical coupler 166 and the EDF 162. The optical coupler 180 inputs the light beam from the optical fiber 152 into the excitation light-beam detector 172.

The excitation light-beam detector 172 detects the light-beam input. Then, the excitation light-beam detector 172 compares the detected light-beam level with a sixth predetermined level. The comparison result is sent to the fault-determining section 106.

The fault-determining section 106, when the comparison result from the excitation light-beam detector 172 indicates that the light-beam level input into the excitation light-beam detector 172 is at or higher than the sixth predetermined level, determines that the optical fibers 152 and 154 are normal. On the other hand, the fault-determining section 106, when the comparison result from the excitation light-beam detector 172 indicates that the light-beam level input into the excitation light-beam detector 172 is lower than the sixth predetermined level, determines that a fault has occurred in one of the optical fibers 152 and 154.

The fault-determining section 106, when determining that the optical fibers 150, 152 and 154 are normal, instructs the signal light-beam transmitter 120 to start transmitting a signal light beam and also instructs the excitation light-beam sources 102 and 170 so as to increase the light-beam outgoing power level up to a level for the EDF 162 to be suitably excited. The signal light-beam transmitter 120 begins transmitting the signal light-beam in response to the instruction from the fault-determining section 106. On the other hand, the excitation light-beam sources 102 and 170 increase the excitation light-beam outgoing power level up to the level for the EDF 162 to be suitably excited in response to the instruction from the fault-determining section 106. Hereby, a signal light-beam from the signal light-beam transmitter 120 is amplified by the EDF 162 for sending to the receiving communications apparatus.

Moreover, the fault-determining section 106 when determining that a fault has occurred in one of the optical fibers 150, 152 and 154 instructs the excitation light-beam sources 102 and 170 to stop transmitting light beams. The excitation light-beam sources 102 and 170 stop transmitting the light beams in response to this instruction.

On the other hand, the excitation light-beam source 202 configuring the receiving optical transmission-path fault-detection system within the receiving communications apparatus, as in the case of the excitation light-beam source 102, transmits a light beam at a predetermined low outgoing power level. The light beam from the excitation light-beam source 202 is input into the optical coupler 280. The optical coupler 280, which may be a small-loss wavelength-multiplexing coupler, for instance, inputs the light beam from the excitation light-beam source 202 into the optical coupler 264 within the optical amplifier 260 via the optical fiber 252.

The optical coupler 264, which may be a small-loss wavelength-multiplexing coupler, for instance, inputs the light beam from the optical fiber 252 into EDF 262. The light beam input into the EDF 262 passes through the EDF 262 while being attenuated, and then is input into the optical coupler 266. The optical coupler 266, which may be a small-loss wavelength-multiplexing coupler, for instance, inputs the light from the EDF 262 into the optical fiber 250. The optical coupler 240, which may be a small-loss wavelength-multiplexing coupler, for instance, inputs the light from the optical fiber 250 into the excitation light-beam detector 204.

The excitation light-beam detector 204 detects the light beam input. Then the excitation light-beam detector 204 compares the detected light-beam level with a seventh predetermined level. The comparison result is sent to the fault-determining section 206.

The fault-determining section 206 when the comparison result from the excitation light-beam detector 204 indicates that the level of the light beam input into the excitation light-beam detector 204 is at or higher than the seventh predetermined level, determines that the optical fibers 250 and 252 are normal. On the other hand, the fault-determining section 206 when the comparison result from the excitation light-beam detector 204 indicates that the level of the light beam input into the excitation light-beam detector 204 is lower than the seventh predetermined level determines that a fault has occurred in one of the optical fibers 250 and 252.

The excitation light-beam source 270 transmits a light beam at a predetermined low outgoing power level. It is noted that the light beam transmitted from the excitation light-beam source 270 has a wavelength which is different from the light transmitted from the excitation light source 202. The light beam from the excitation light-beam source 270 is input into the optical coupler 266. The optical coupler 266 inputs the light beam from the excitation light-beam source 270 into the EDF 262. The light beam input into the EDF 262 passes through the EDF 262 for inputting into the optical coupler 264. The optical coupler 264 inputs into the optical fiber 252 the light beam that is transmitted from the excitation light-beam source 270 and that passes through the optical fiber 254, the optical coupler 266 and the EDF 262. The optical coupler 280 is input the light beam from the optical fiber 252 into the excitation light-beam detector 272.

The excitation light-beam detector 272 detects the light-beam input. Then, the excitation light-beam detector 272 compares the detected light-beam level with an eighth predetermined level. The compared result is sent to the fault-determining section 206.

The fault-determining section 206, when the comparison result from the excitation light-beam detector 272 indicates that the level of the light beam input into the excitation light-beam detector 272 is at or higher than the eighth predetermined level, determines that the optical fibers 252 and 254 are normal. On the other hand, the fault-determining section 206, when the comparison result from the excitation light-beam detector 272 indicates that the level of the light beam input into the excitation light-beam detector 272 is lower than the eighth predetermined level, determines that a fault has occurred in one of the optical fibers 252 and 254.

The fault-determining section 206, when determining that the optical fibers 250, 252 and 254 are normal, instructs the excitation light-beam sources 202 and 270 so as to increase the outgoing power level of the excitation light-beam to a level for the EDF 262 to be suitably excited. The excitation light-beam sources 202 and 270 in response to this instruction increase the outgoing power level of the excitation light-beam to a level for the EDF 262 to be suitably excited. Hereby, a signal light-beam passing through the EDF 262 is amplified for transmitting to the receiving communications apparatus.

Moreover, the fault-determining section 206 when determining that there is a fault in one of the optical fibers 250, 252 and 254, instructs the excitation light-beam sources 202 and 270 to stop transmitting light beams. The excitation light-beam source 202 and 270 stop transmitting the light beams in response to this instruction.

Next, the fourth embodiment is described. The excitation light-beam source 102 configuring the transmitting optical-transmission path fault-detection system within the transmitting communications apparatus suitably excites the EDF 162 so as to transmit an excitation light beam at a predetermined high outgoing power level in order to transmit the signal light-beam from the signal light-beam transmitter 120 to the receiving communications apparatus. It is noted that this excitation light-beam has a wavelength different from a signal light-beam transmitted from the signal light-beam transmitter 120. The excitation light beam from the excitation light-beam source 102 is transmitted through the optical fiber 152 via the optical coupler 180 and input into the optical coupler 164 within the optical amplifier 160.

The optical coupler 164 sends the signal light-beam that is transmitted from the signal light-beam transmitter 120 and passes through the optical coupler 140, the optical fiber 150, the optical coupler 166 and the EDF 162, to the receiving communications apparatus. Then, the optical coupler 164 inputs the excitation light-beam from the optical fiber 152 into the EDF 162. The excitation light-beam input into the EDF 162 passes through the EDF 162 and is input into the optical coupler 166. The optical coupler 166 inputs the signal light-beam transmitted from the signal light-beam transmitter 120 into the EDF 162 and inputs the excitation light-beam from the EDF 162 into the optical fiber 150. The optical coupler 140 inputs the signal light-beam transmitted from the signal light-beam transmitter 120 into the optical fiber 150 and inputs the excitation light-beam from the optical fiber 150 into the excitation light-beam detector 104.

The excitation light-beam detector 104 detects the input light-beam. Then, the excitation light-beam detector 104 compares the detected light-beam level with a ninth predetermined level. The comparison result is sent to the fault-determining section 106.

The fault-determining section 106, when the comparison result from the excitation light-beam detector 104 indicates that the light-beam level input into the excitation light-beam detector 104 is at or greater than the ninth predetermined level, determines that the optical fibers 150 and 152 are normal. On the other hand, the fault-determining section 106, when the comparison result from the excitation light-beam detector 104 indicates that the light-beam level input into the excitation light-beam detector 104 is lower than the ninth predetermined level, determines that a fault has occurred in one of the optical fibers 150 and 152.

The light beam transmitted from the excitation light-beam source 170 has a wavelength which is different from the light beams transmitted from the excitation light-beam source 102 and the signal light-beam transmitter 120. The light beam from this excitation light source 170 is input into the optical coupler 166 via the optical fiber 154. The optical coupler 166 inputs the light beam from the excitation light source 170 into the EDF 162. The light beam input into the EDF 162 passes through the EDF 162 and is input into the optical coupler 164. The optical coupler 164 inputs into the optical fiber 152 the light beam that is transmitted from the excitation light-beam source 170 and that passes through the optical fiber 154, the optical coupler 166 and the EDF 162. The optical coupler 180 inputs the light beam from the optical fiber 152 into the excitation light-beam detector 172.

The excitation light-beam detector 172 detects the light-beam input. Then, the excitation light-beam detector 172 compares the detected light-beam level with a tenth predetermined level. The comparison result is sent to the fault-determining section 106.

The fault-determining section 106, when the comparison result from the excitation light-beam detector 172 indicates that the light-beam level input into the excitation light-beam detector 172 is at or greater than the tenth predetermined level, determines that the optical fibers 152 and 154 are normal. On the other hand, the fault-determining section 106, when the comparison result from the excitation light-beam detector 172 indicates that the light-beam level input into the excitation light-beam detector 172 is below the tenth predetermined level, determines that a fault has occurred in one of the optical fibers 152 and 154.

The fault-determining section 106 when determining that a fault has occurred in one of the optical fibers 150, 152 and 154 instructs the signal light-beam transmitter 120 to stop transmitting a signal light beam and the excitation light-beam sources 102 and 170 to stop transmitting excitation light beams. The signal light-beam transmitter 120 stops transmitting the signal light-beam in response to the instruction from the fault-determining section 106. On the other hand, the excitation light-beam sources 102 and 170 stop transmitting the excitation light beams in response to the instruction from the fault-determining section 106.

Then, the fault-determining section 106, when determining that the optical fibers 150, 152 and 154 are normal, instructs none of the signal light-beam transmitter 120 and the excitation light-beam sources 102 and 170. Thus, the signal light-beam transmitter 120 continues transmitting the signal light-beam while the excitation light-beam sources 102 and 170 continue transmitting the excitation light-beams.

Now, the excitation light-beam source 202 configuring the receiving optical transmission-path fault-detection system within the receiving communications apparatus suitably excites the EDF 262 so as to transmit an excitation light-beam at a predetermined high outgoing power level in order to transmit the signal light-beam from the signal light-beam transmitter 120 to the receiving communications apparatus. It is noted that this excitation light-beam has a wavelength which is different from the signal light-beam transmitted from the signal light-beam transmitter 120. The excitation light-beam from the excitation light-beam source 202 is transmitted through the optical fiber 252 via the optical coupler 280 for inputting into the optical coupler 264 within the optical amplifier 260.

The optical coupler 264 inputs into the EDF 262 the signal light-beam that is transmitted from the signal light-beam transmitter 120 and that passes through the optical coupler 140, the optical fiber 150, optical coupler 166, the EDF 162, the optical coupler 164 and the optical fiber 350, and the excitation light-beam that passes through the optical fiber 252. The signal and excitation light-beams input into the EDF 262 pass through the EDF 262, and then are transmitted into the optical coupler 266.

The optical coupler 266 inputs the signal and excitation light-beams into the optical coupler 240 through the optical fiber 250. The optical coupler 240 inputs the signal light-beam transmitted from the signal light-beam transmitter 120 into the signal light-beam receiver 220 and the excitation light-beam from the excitation light-beam source 202 into the excitation light-beam detector 204.

The excitation light-beam detector 204 detects the light-beam input. Then the excitation light-beam detector 204 compares the detected excitation light-beam level with an eleventh predetermined level. The comparison result is sent to the fault-determining section 206.

The fault-determining section 206 determines, when the comparison result from the excitation light-beam detector 204 indicates that the level of the excitation light-beam input into the excitation light-beam detector 204 is at or greater than the eleventh predetermined level, determines that the optical fibers 250 and 252 are normal. On the other hand, the fault-determining section 206, when the comparison result from the excitation light-beam detector 204 indicates that the level of the excitation light-beam input into the excitation light-beam detector 204 is lower than the eleventh predetermined level, determines that a fault has occurred in one of the optical fibers 250 and 252.

The excitation light-beam source 270 transmits a light beam at a predetermined low outgoing power level. It is noted that the light beam transmitted from the excitation light-beam source 270 has a wavelength which is different from the light beams transmitted from the excitation light source 202 and the signal light-beam transmitter 120. The light beam from the excitation light-beam source 270 is input into the optical coupler 266 via the optical fiber 254. The optical coupler 266 inputs the light beam from the excitation light-beam source 270 into the EDF 262. The light beam input into the EDF 262 passes through the EDF 262 for inputting into the optical coupler 264. The optical coupler 264 inputs into the optical fiber 252 the light beam that is transmitted from the excitation light-beam source 270 and that passes through the optical fiber 254, the optical coupler 266 and the EDF 262. The optical coupler 280 inputs the light beam from the optical fiber 252 into the excitation light-beam detector 272.

The excitation light-beam detector 272 detects the light beam input. Then, the excitation light-beam detector 272 compares the detected light-beam level with a twelfth predetermined level. The compared result is sent to the fault-determining section 206.

The fault-determining section 206 when the comparison result from the excitation light-beam detector 272 indicates that the level of the light beam input into the excitation light-beam detector 272 is at or greater than the twelfth predetermined level, determines that the optical fibers 252 and 254 are normal. On the other hand, the fault-determining section 206 when the comparison result from the excitation light-beam detector 272 indicates that the level of the light beam input into the excitation light-beam detector 272 is lower than the twelfth predetermined level, determines that a fault has occurred in one of the optical fibers 252 and 254.

The fault-determining section 206 when determining that the optical fibers 250, 252 and 254 are normal instructs neither of the excitation light-beam sources 202 and 270. Thus, the excitation light-beam sources 202 and 270 continue transmitting the excitation light-beams.

Moreover, the fault-determining section 206 when determining that there is a fault in one of the optical fibers 250, 252 and 254, instructs the excitation light-beam sources 202 and 270 to stop transmitting light beams. The excitation light-beam sources 202 and 270 stop transmitting the light beams in response to this instruction. Therefore, the excitation light-beams are transmitted through none of the optical fibers 250, 252 and 254. Moreover, even when a signal light-beam is transmitted from the signal light-beam transmitter 120, the EDF 262 is not excited so that the signal light-beam is not transmitted through the optical fiber 250.

Figure 3:
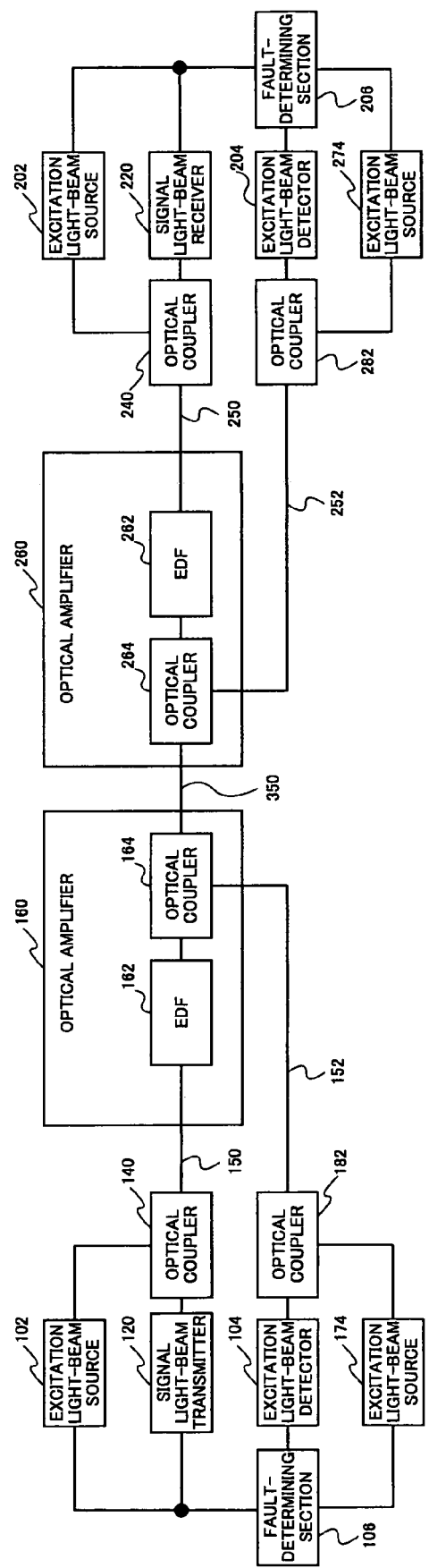
FIG. 3 is a diagram illustrating a third configuration example of the optical transmission system.

FIG. 3 is a diagram illustrating a third configuration example of the optical transmission system having the optical transmission-path fault-detection system of the present invention. The optical transmission system illustrated in FIG. 3, as compared with the optical transmission system illustrated in FIG. 1, comprises within the transmitting communications apparatus an excitation light-beam source 102 connected to an optical coupler 140 and an excitation light-beam detector 104 connected to an optical fiber 152 via an optical coupler 182. Moreover, an excitation light-beam source 174 is connected to the optical coupler 182. On the other hand, the optical transmission system illustrated in FIG. 3 comprises within the receiving communications apparatus an excitation light-beam source 202 connected to an optical coupler 240 and an excitation light-beam detector 204 connected to an optical fiber 252 via an optical coupler 282. Moreover, an excitation light-beam source 274 is connected to the optical coupler 282.

In the optical transmission system illustrated in FIG. 3, as in the optical transmission system illustrated in FIG. 1, a signal light-beam is transmitted from the communications apparatus at the transmitting-station side to the communications apparatus at the receiving-station side. This signal light-beam is transmitted through the optical fibers 150 and 250. The excitation light-beam source 102, the excitation light-beam detector 104 and the fault-determining section 106 within the communications apparatus at the transmitting station configure a system for detecting a fault in the optical transmission path for detecting a fault in the optical fibers 150 and 152 (the transmitting optical-transmission path fault-detection system). On the other hand, the excitation light-beam source 202, the excitation light-beam detector 204 and the fault-determining section 206 within the communications apparatus at the receiving station configure a system for detecting a fault in the optical transmission path for detecting a fault in the optical fibers 250 and 252 (the receiving optical-transmission path fault-detection system).

Below, an operation of the optical transmission system illustrated in FIG. 3 is described for a fifth embodiment for detecting a fault in the optical fibers 150, 152, 250 and 252 before the signal light-beam is transmitted from the transmitting communications apparatus to the receiving communications apparatus, and a sixth embodiment for detecting a fault in the optical fibers 150, 152, 250, and 252 while the signal light-beam is being transmitted from the transmitting communications apparatus to the receiving communications apparatus.

Now, the fifth embodiment is described. The excitation light-beam source 102 configuring the transmitting optical-transmission path fault-detection system within the transmitting communications apparatus transmits a light beam at a predetermined low outgoing power level. The light beam from the excitation light-beam source 102 is transmitted to the optical coupler 140. The optical coupler 140, which may be, for instance, a small-loss wavelength-multiplexing coupler, inputs the light beam from the excitation light-beam source 102 via the optical fiber 150 to the EDF 162 within the optical amplifier 160. The light-beam input into the EDF 162 passes through the EDF 162 while being attenuated and is input into the optical coupler 164. The optical coupler 164, which may be, for instance, a small-loss wavelength-multiplexing coupler, inputs the light beam from the EDF 162 into the optical fiber 152. The optical coupler 182, which may be, for instance, a small-loss wavelength-multiplexing coupler, inputs the light beam from the optical fiber 152 into the excitation optical detector 104.

The excitation light-beam detector 104 detects the light beam input. Then, the excitation light-beam detector 104 compares the detected light-beam level with a thirteenth predetermined level. The comparison result is sent to the fault-determining section 106.

The fault-determining section 106, when the comparison result from the excitation light-beam detector 104 indicates that the light-beam level input into the excitation light-beam detector 104 is at or higher than the thirteenth predetermined level, determines that the optical fibers 150 and 152 are normal. On the other hand, the fault-determining section 106, when the comparison result from the excitation light-beam detector 104 indicates that the light-beam level input into the excitation light-beam detector 104 is lower than the thirteenth predetermined level, determines that a fault has occurred in one of the optical fibers 150 and 152.

The fault-determining section 106, when determining that the optical fibers 150 and 152 are normal, instructs the signal light-beam transmitter 120 to start transmitting a signal light beam and also instructs the excitation light-beam sources 102 and 174 such as to increase the light-beam outgoing power level up to a level for the EDF 162 to be suitably excited. The signal light-beam transmitter 120 begins transmitting the signal light-beam in response to the instruction from the fault-determining section 106. On the other hand, the excitation light-beam sources 102 and 174 increase the excitation light-beam outgoing power level up to the level for the EDF 162 to be suitably excited in response to the instruction from the fault-determining section 106. It is noted that the light beam transmitted from the excitation light-beam source 174 has a wavelength which is different from the light-beams transmitted from the excitation light-beam source 102 and the signal light-beam transmitter 120. The light-beam from the excitation light-beam source 174 passes through the optical coupler 182, the optical fiber 152 and the optical coupler 164 for exciting the EDF 162. Hereby, a signal light-beam from the signal light-beam transmitter 120 is amplified so as to be sent to the receiving communications apparatus.

Moreover, the fault-determining section 106 when determining that a fault has occurred in one of the optical fibers 150 and 152 instructs the excitation light-beam source 102 to stop transmitting a light beam. The excitation light-beam source 102 stops transmitting the light beam in response to this instruction.

On the other hand, the excitation light-beam source 202 configuring the receiving optical transmission-path fault-detection system within the receiving communications apparatus transmits a light beam at a predetermined low outgoing power level. The light beam from the excitation light-beam source 202 is input into the optical coupler 240. The optical coupler 240, which may be a small-loss wavelength-multiplexing coupler, for instance, inputs the light beam from the excitation light-beam source 202 into the EDF 262 within the optical amplifier 260 via the optical fiber 250. The light beam input into the EDF 262 passes through the EDF 262 while being attenuated for inputting into the optical coupler 264. The optical coupler 264, which may be a small-loss wavelength-multiplexing coupler, for instance, inputs the light beam from the EDF 262 into the optical fiber 252. The optical coupler 282, which may be a small-loss wavelength-multiplexing coupler, for instance, inputs the light from the optical fiber 252 into the excitation light-beam detector 204.

The excitation light-beam detector 204 detects the light beam input. Then the excitation light-beam detector 204 compares the detected light-beam level with a fourteenth predetermined level. The comparison result is sent to the fault-determining section 206.

The fault-determining section 206 when the comparison result from the excitation light-beam detector 204 indicates that the level of the light beam input into the excitation light-beam detector 204 is at or greater than the fourteenth predetermined level, determines that the optical fibers 250 and 252 are normal. On the other hand, the fault-determining section 206 when the comparison result from the excitation light-beam detector 204 indicates that the level of the light beam input into the excitation light-beam detector 204 is lower than the fourteenth predetermined level, determines that a fault has occurred in one of the optical fibers 250 and 252.

The fault-determining section 206 when determining that the optical fibers 250 and 252 are normal instructs the excitation light-beam sources 202 and 274 so as to increase the outgoing power level of the excitation light-beam to a level for the EDF 262 to be suitably excited. The excitation light-beam sources 202 and 274 in response to this instruction from the fault-determining section 206 increase the outgoing power level of the excitation light-beam to a level for the EDF 262 to be suitably excited. It is noted that the light beam transmitted from the excitation light-beam source 274 has a wavelength which is different from the light beams transmitted from the excitation light-beam source 202 and the signal light-beam transmitter 120. The light beam from the excitation light-beam source 274 passes through the optical coupler 282, the optical fiber 252, and the optical coupler 264 for exciting the EDF 262. Hereby, a signal light-beam from the signal light-beam transmitter 220 is amplified for sending to the receiving communications apparatus via the optical fiber 250.

Moreover, the fault-determining section 206 when determining that there is a fault in one of the optical fibers 250 and 252, instructs the excitation light-beam source 202 to stop transmitting a light beam. The excitation light-beam source 202 stops transmitting the light beam in response to this instruction.

Next, the sixth embodiment is described. The excitation light-beam source 102 configuring the transmitting optical-transmission path fault-detection system within the transmitting communications apparatus suitably excites the EDF 162 so as to transmit an excitation light beam at a predetermined high outgoing power level in order to transmit the signal light-beam from the signal light-beam transmitter 120 to the receiving communications apparatus. It is noted that this excitation light-beam has a wavelength different from a signal light-beam transmitted from the signal light-beam transmitter 120. The excitation light beam from the excitation light-beam source 102 is transmitted through the optical fiber 150 via the optical coupler 140 and input into the EDF 162. The excitation light-beam input into the EDF 162 passes through the EDF 162 for inputting into the optical coupler 164.

The optical coupler 164 sends the signal light-beam that is transmitted from the signal light-beam transmitter 120 and that passes through the optical coupler 140, the optical fiber 150 and the EDF 162, to the receiving communications apparatus. Then, the optical coupler 164 inputs the excitation light-beam from the excitation light-beam source 102 and that passes through the optical coupler 140, the optical fiber 150 and the EDF 162 is input into the optical fiber 152. The excitation light-beam input into the optical fiber 152 is input into the excitation light-beam detector 104 via the optical coupler 182.

The excitation light-beam detector 104 detects the light beam input. Then, the excitation light-beam detector 104 compares the detected light-beam level with a fifteenth predetermined level. The comparison result is sent to the fault-determining section 106.

The fault-determining section 106, when the comparison result from the excitation light-beam detector 104 indicates that the light-beam level input into the excitation light-beam detector 104 is at or more than the fifteenth predetermined level, determines that the optical fibers 150 and 152 are normal. On the other hand, the fault-determining section 106, when the comparison result from the excitation light-beam detector 104 indicates that the light-beam level input into the excitation light-beam detector 104 is lower than the fifteenth predetermined level, determines that a fault has occurred in one of the optical fibers 150 and 152.

The fault-determining section 106 when determining that a fault has occurred in one of the optical fibers 150 and 152 instructs the signal light-beam transmitter 120 to stop transmitting a signal light beam and the excitation light-beam sources 102 and 174 to stop transmitting excitation light beams. The signal light-beam transmitter 120 stops transmitting the signal light-beam in response to the instruction from the fault-determining section 106. On the other hand, the excitation light-beam sources 102 and 174 stop transmitting the excitation light beams in response to the instruction from the fault-determining section 106.

Then, the fault-determining section 106, when determining that the optical fibers 150 and 152 are normal, instructs none of the signal light-beam transmitter 120 and the excitation light-beam sources 102 and 174. Thus, the signal light-beam transmitter 120 continues transmitting the signal light-beam while the excitation light-beam sources 102 and 174 continue transmitting the excitation light-beams.

Now, the excitation light-beam sources 202 and 274 configuring the receiving optical transmission-path fault-detection system within the receiving communications apparatus, as in the excitation light-beam sources 102 and 174, suitably excites the EDF 262 so as to transmit an excitation light-beam at a predetermined high outgoing power level in order to transmit the signal light-beam from the signal light-beam transmitter 120 to the receiving communications apparatus. It is noted that this excitation light-beam has a wavelength which is different from the signal light-beam transmitted from the signal light-beam transmitter 120. The excitation light-beam from the excitation light-beam source 202 is transmitted through the optical fiber 250 via the optical coupler 240 for inputting into the optical coupler 262. The excitation light-beam input into the EDF 262 is further input into the optical coupler 264.

The optical coupler 264 inputs into the EDF 262 the signal light-beam that is transmitted from the signal light-beam transmitter 120 and that passes through the optical coupler 140, the optical fiber 150, the EDF 162, the optical coupler 164 and the optical fiber 350. Then the optical coupler 264 inputs into the optical fiber 252 the excitation light-beam that is transmitted from the excitation light-beam transmitter 202 and that passes through the optical coupler 240, the optical fiber 250, the EDF 262. The excitation light-beam input into the optical fiber 252 is input into the excitation light-beam detector 204 via the optical coupler 282.

The excitation light-beam detector 204 detects the excitation light-beam input. Then the excitation light-beam detector 204 compares the detected excitation light-beam level with a sixteenth predetermined level. The comparison result is sent to the fault-determining section 206.

The fault-determining section 206 determines, when the comparison result from the excitation light-beam detector 204 indicates that the level of the excitation light-beam input into the excitation light-beam detector 204 is at or higher than the sixteenth predetermined level, determines that the optical fibers 250 and 252 are normal. On the other hand, the fault-determining section 206, when the comparison result from the excitation light-beam detector 204 indicates that the level of the excitation light-beam input into the excitation light-beam detector 204 is lower than the sixteenth predetermined level, determines that a fault has occurred in one of the optical fibers 250 and 252.

The fault-determining section 206 when determining that there is a fault in one of the optical fibers 250 and 252, instructs the excitation light-beam sources 202 and 274 to stop transmitting excitation light beams. The excitation light-beam sources 202 and 274 stop transmitting the excitation light beams in response to the instruction from the fault-determining section 206. Therefore, the excitation light-beams are transmitted through neither of the optical fibers 250 and 252. Moreover, even when a signal light-beam is transmitted from the signal light-beam transmitter 120, the EDF 262 is not excited so that the signal light-beam is not transmitted through the optical fiber 250.

On the other hand, the fault-determining section 206 when determining that the optical fibers 250 and 252 are normal instructs neither of the excitation light-beam sources 202 and 274. Thus, excitation light-beam sources 202 and 274 continue transmitting the excitation light-beams.

Figure 4:
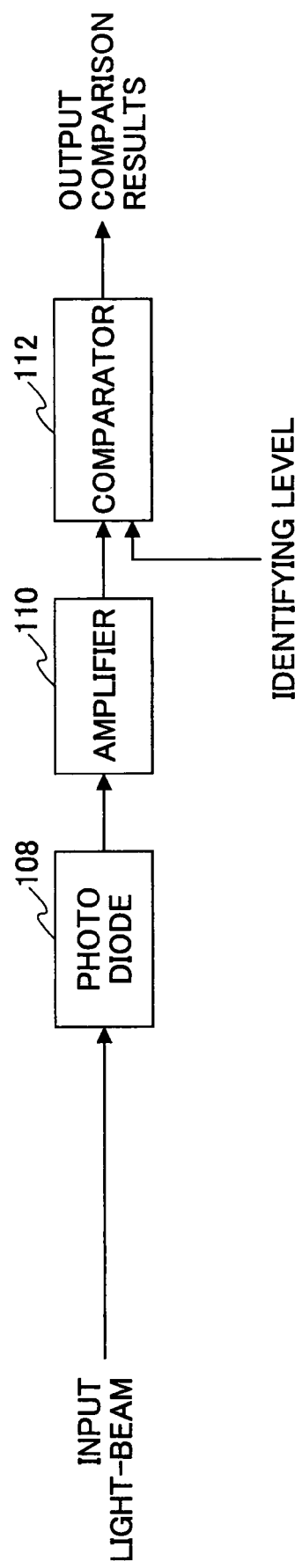
FIG. 4 is a first configuration example of an excitation light-beam detector.
Figure 5:
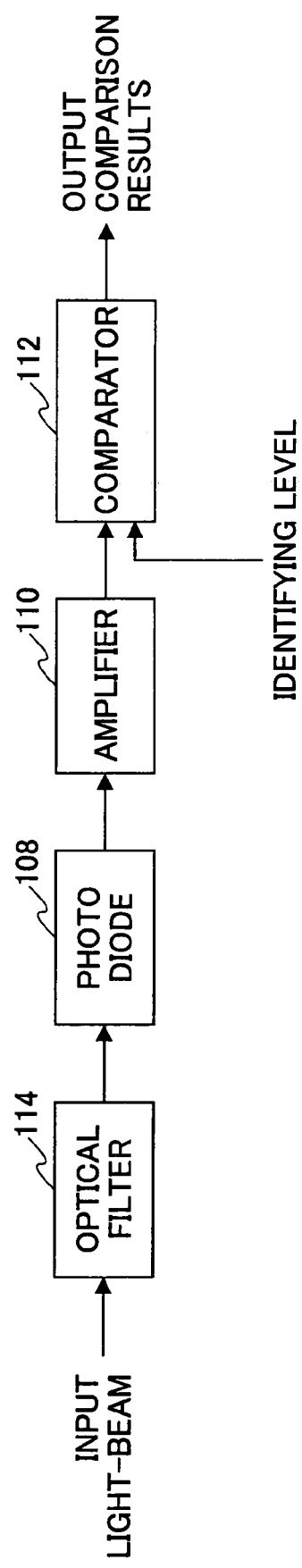
FIG. 5 is a second configuration example of the excitation light-beam detector.

FIGS. 4 through 6 are diagrams illustrating configuration examples of an excitation light-beam detector 104. It is noted that excitation light-beam detectors 172, 204, and 272 also have the same configuration as the excitation light-beam detector 104. The excitation light-beam detector 104 illustrated in FIG. 4 comprises a photodiode 108, an amplifier 110 and a comparator 112. The photodiode 108 converts a light beam input into an electrical signal for outputting the signal. The amplifier 110 amplifies this electrical signal for outputting to the comparator 112. The comparator 112 compares a level (a voltage) of an electrical signal input with an identifying level (a voltage) being a predetermined level so as to output the compared result to a fault-determining section 106.

An excitation light-beam detector 104 illustrated in FIG. 5 as compared to FIG. 4 has a configuration comprising an optical filter 114 just preceding the photodiode 108. This optical filter 114 outputs only light beams having certain wavelengths out of light beams input. Providing this optical filter 114 allows the excitation light-beam detector 104 to extract, even when the light input contains both the signal light beam and the excitation light beams, only the excitation light beams.

The excitation light-beam detector 104 illustrated in FIG. 6 as compared to FIG. 5 is such that the comparator 112 compares a level (a voltage) of an electrical signal input with a light-beam outgoing power level of the excitation light-beam source 102, etc. While the excitation light-beam source 102, etc., before a signal light-beam transmission starts from the transmitting communications apparatus to the receiving communications apparatus, transmits a light beam at a low light-beam outgoing power in order to detect a fault in the optical fiber 150, etc., when the signal light-beam transmission from the transmitting communications apparatus to the receiving communications apparatus has started, the light beam is used also for exciting the EDF 162 within the optical amplifier 160, resulting in a high light-beam outgoing power level at or higher than 1 W. Thus, setting the identifying level to be a voltage proportional to the light-beam outgoing power of the excitation light-beam source 102, etc., makes it possible to prevent an occurrence such that the optical fiber 150, etc., being erroneously detected as being normal in such as case as when a fault has occurred in the optical fiber 150, etc., after the signal light-beam transmission has started, as the identifying level would be low despite a decrease in the excitation light-beam level in the excitation light-beam detector 104 due to the fault.

What is claimed is:

1. An optical transmission-path fault-detection system comprising:
    a first excitation light-beam source connected by a first optical transmission path to an optical amplifier for transmitting a light beam to said first optical-transmission path, wherein the first excitation light-beam source is an excitation light source to provide excitation light to the optical amplifier so that a signal light beam is optically amplified by the optical amplifier in accordance with the provided excitation light;
    first optical-detection means for detecting the light beam which is transmitted from said first excitation light-beam source and input via said first optical-transmission path, then to said optical amplifier and then to a second optical-transmission path, to said first optical-detection means; and
    first fault-determining means for determining, when a light beam level detected by said first optical-detection means is lower than a predetermined level, that a fault has occurred in one of said first optical-transmission path and said second optical-transmission path, and determining, when the light beam level is at or higher than the predetermined level, that said first optical-transmission path and said second optical-transmission path are normal; and
    stop-instruction means for instructing said first excitation light-beam source, when determining by said first fault-determining means that the fault has occurred in one of said first optical-transmission path and said second optical-transmission path, to stop transmitting said light beam.

2. The optical transmission-path fault-detection system as claimed in claim 1, further comprising:
    means for instructing a signal light beam transmitter, when determining by said first fault-determining means that said first optical-transmission path and said second optical-transmission path are normal, to start transmitting a signal light beam which is amplified by said optical amplifier.

3. The optical transmission-path fault-detection system as claimed in claim 1, further comprising:
    means for instructing the first excitation light-beam source, when determining by said first fault-determining means that said first optical-transmission path and said second optical-transmission path are normal, to increase a power level of said light beam transmitted by said first excitation light-beam source so that the transmitted light beam operates as excitation light for said optical amplifier.

4. The optical transmission-path fault-detection system as claimed in claim 1, wherein a signal light beam transmitter transmits a signal light beam to the optical amplifier for amplification by the optical amplifier, further comprising:
    means for instructing the signal light beam transmitter, when determining by said first fault-determining means that the fault has occurred in one of said first optical-transmission path and said second optical-transmission path, to stop transmitting the signal light beam.

5. The optical transmission-path fault-detection system as claimed in claim 1, further comprising:
    a second excitation light-beam source connected by a third optical transmission path with said optical amplifier for transmitting a light beam to said third optical-transmission path;
    second optical-detection means for detecting the light beam which is transmitted by said second excitation light-beam source and input via said third optical-transmission path, then said optical amplifier and then a fourth optical-transmission path, to said second optical-detection means; and
    second fault-determining means for determining, when a light beam level detected by said second optical-detection means is lower than a predetermined level, that the fault has occurred in one of said third optical-transmission path and said fourth optical-transmission path, and determining, when the light beam level is at or higher than the predetermined level, that said third optical-transmission path and said fourth optical-transmission path are normal.

6. The optical transmission-path fault-detection system as claimed in claim 5, further comprising:
    means for instructing a signal light beam transmitter, when determining by said first fault-determining means and said second fault-determining means that said first optical-transmission path, said second optical-transmission path, said third optical-transmission path and said fourth optical-transmission path are normal, to start transmitting a signal light beam which is amplified by said optical amplifier.

7. The optical transmission-path fault-detection system as claimed in claim 5, further comprising:
    means for instructing the second excitation light-beam source, when determining by said first fault-determining means and said second fault-determining means that said first optical-transmission path, said second optical-transmission path, said third optical-transmission path and said fourth optical-transmission path are normal, to increase a power level of said light beam transmitted by said second excitation light-beam source so that the transmitted light beam operates as excitation light for said optical amplifier.

8. The optical transmission-path fault-detection system as claimed in claim 5, wherein a signal light beam transmitter transmits a signal light beam to the optical amplifier for amplification by the optical amplifier, further comprising:

means for instructing said signal light beam transmitter, when determining by said first fault-determining means and said second fault-determining means that the fault has occurred in one of said first optical-transmission path, said second optical-transmission path, said third optical-transmission path and said fourth optical-transmission path, to stop transmitting the signal light beam.

9. The optical transmission-path fault-detection system as claimed in claim 5, further comprising:

means for instructing said first excitation light-beam source and said second excitation light-beam source, when determining by said first fault-determining means and said second fault-determining means that the fault has occurred in one of said first optical-transmission path and said fourth optical-transmission path, to stop transmitting the corresponding light beam.

10. An apparatus comprising:

a rare earth doped fiber;

an excitation light source providing excitation light to the fiber so that the excitation light travels through the fiber and so that a signal light traveling through the fiber is amplified in accordance with the provided excitation light;

a detector detecting the excitation light after traveling through the fiber; and a fault determiner determining whether a fault has occurred in a transmission path traveled by the excitation light in accordance with the detected excitation light, and causing the excitation light source to stop providing the excitation light when the fault determiner determines that a fault has occurred.

11. An apparatus as in claim 10, wherein the fault determiner causes the signal light to stop being transmitted when the fault determiner determines that a fault has occurred.

12. An apparatus comprising:

a rare earth doped fiber;

an excitation light source providing light to the fiber so that the provided light travels through the fiber, wherein the provided light is at a power level which is too low to be excitation light to cause a signal light traveling through the fiber to be sufficiently amplified; and a detector detecting the provided light after traveling through the fiber; and a fault determiner determining whether a fault has occurred in a transmission path traveled by the provided light in accordance with the detected light.

13. An apparatus as in claim 12, wherein, when the fault determiner determines that a fault has not occurred, the fault determiner causes the excitation light source to increase the power level of the provided light so that the provided light is at a power level which causes signal light traveling through the fiber to be amplified.

14. An apparatus as in claim 12, wherein signal light is not provided to the fiber until the fault determiner determines that a fault has not occurred.

15. An apparatus as in claim 13, wherein signal light is not provided to the fiber until the fault determiner determines that a fault has not occurred.

16. An apparatus comprising:

a rare earth doped fiber;

an excitation light source providing light to the fiber so that the provided light travels through the fiber, wherein the provided light is at a power level which is too low to be excitation light to cause a signal light traveling through the fiber to be sufficiently amplified;

means for detecting the provided light after traveling through the fiber; and means for determining whether a fault has occurred in a transmission path traveled by the provided light in accordance with the detected light.

17. An apparatus as in claim 16, further comprising:

means, when said means for determining determines that a fault has not occurred, for causing the excitation light source to increase the power level of the provided light so that the provided light is at a power level which causes signal light traveling through the fiber to be amplified.

18. An apparatus as in claim 16, wherein signal light is not provided to the fiber until said means for determining determines that a fault has not occurred.

19. An apparatus as in claim 17, wherein signal light is not provided to the fiber until said means for determining determines that a fault has not occurred.

* * * * *

UNITED STATES PATENT AND TRADEMARK OFFICE
CERTIFICATE OF CORRECTION

PATENT NO.        : 7,428,354 B2                                              Page 1 of 1
APPLICATION NO.   : 11/080554
DATED             : September 23, 2008
INVENTOR(S)       : Takashi Miyazaki It is certified that error appears in the above-identified patent and that said Letters Patent is hereby corrected as shown below:

Title Page, Item (56) (Other Publications), Line 2, change "BGit/s" to --GBit/s--.

Signed and Sealed this

Sixth Day of January, 2009

JON W. DUDAS
*Director of the United States Patent and Trademark Office*